United States Patent
Pokharna et al.

(10) Patent No.: US 6,795,311 B2
(45) Date of Patent: Sep. 21, 2004

(54) METHOD AND APPARATUS FOR COOLING PORTABLE COMPUTERS

(75) Inventors: Himanshu Pokharna, San Jose, CA (US); Gregory M. Chrysler, Chandler, AZ (US); Eric DiStefano, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/040,600

(22) Filed: Dec. 28, 2001

(65) Prior Publication Data

US 2003/0123223 A1 Jul. 3, 2003

(51) Int. Cl.⁷ .............................................. G06F 1/16
(52) U.S. Cl. ...................... 361/687; 361/704; 710/303; 710/304

(58) Field of Search ................................. 361/686–687; 710/100–103, 304, 324; 713/300, 310, 320, 322, 323, 330, 340

(56) References Cited

U.S. PATENT DOCUMENTS

| | | | | |
|---|---|---|---|---|
| 5,969,939 A | * | 10/1999 | Moss et al. | 361/686 |
| 6,255,622 B1 | * | 7/2001 | May et al. | 219/209 |
| 6,275,945 B1 | * | 8/2001 | Tsuji et al. | 713/300 |
| 6,453,378 B1 | * | 9/2002 | Olson et al. | 710/304 |
| 6,463,396 B1 | * | 10/2002 | Nishigaki | 702/132 |

* cited by examiner

Primary Examiner—Darren Schuberg
Assistant Examiner—Anthony Q. Edwards
(74) Attorney, Agent, or Firm—Ben D. Burge

(57) ABSTRACT

A method and apparatus for cooling a portable computer system using a computer cooler with a cold plate that comes into contact with the portable computer system to transfer heat from the portable computer system to the environment surrounding the computer cooler.

11 Claims, 4 Drawing Sheets

METHOD AND APPARATUS FOR COOLING PORTABLE COMPUTERS

FIELD OF THE INVENTION

The present invention is related to cooling methods and apparatus to cool a portable computer system.

ART BACKGROUND

Computer systems continue to increase in performance and capability as ever faster processors, memory and other components are used. However, these increases in performance and capability often come with the requirements of higher power consumption and/or higher heat dissipation by components within the computer system.

At the same time, portable computer systems have increasingly supplanted more stationary computer systems, such as so-called 'desktop' or 'mini-tower' computer systems, or other forms of stationary 'personal' computer systems. However, to be portable, portable computer systems often must be of smaller size and lighter weight compared to such stationary computer systems. This need to be portable often means that there is often no room for such apparatus to cool a portable computer system as can often be found in more stationary computer systems. The need to be portable often also means that the only power source that is more consistently available is a portable power source, such as a battery, that imposes limits on the amount of power available. These limits on available power can, in turn, impose limits on the degree to which the components of a portable computer system can be cooled.

This reduced ability to cool components often requires that portable computer systems must be operated at reduced levels of performance and/or capability as compared to more stationary computer systems in order to limit the amount of heat produced by its components. Ultimately, this often prevents portable computer systems from ever fully matching the performance and/or capabilities of more stationary computer systems, and this often requires end users of such portable computer systems to accept trading away performance and/or capabilities to have the benefits of portability.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention, and that numerous details may be changed without departing from the spirit and scope of the invention as hereinafter claimed.

The present invention concerns methods and apparatus to cool a portable computer system. Specifically, various embodiments of the present invention relate to providing a computer cooler in the form of what is commonly referred to as a 'docking station' (also sometimes referred to as a 'base' or 'base station' or 'port replicator' incorporating cooling apparatus to cool components of a portable computer (such as a 'notebook computer') when the portable computer is physically coupled or 'docked' by way of physical contact with the portable computer to conduct heat away from the portable computer. However, although the present invention is discussed with reference to cooling a portable computer in the form of a notebook computer, it will be understood by those skilled in the art that the present invention may be applied to the cooling of other forms of portable computers, both large and small, including so-called 'handheld' computers, 'tablet' computers, 'clamshell' computers, 'briefcase' computers, and 'luggable' computers. Furthermore, although the present invention is discussed with reference to incorporating cooling apparatus within a docking station, those skilled in the art will appreciate that the present invention may be applied to other forms of devices or attachments meant to be used with a portable computer.

Figure 1:
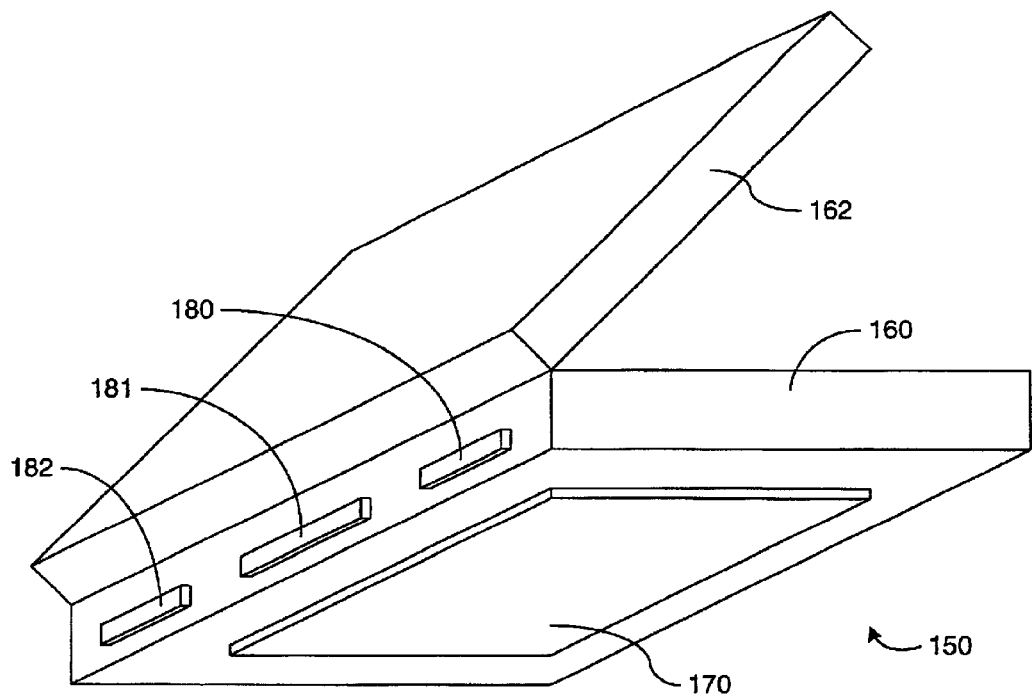
FIG. 1 is a perspective view of one embodiment of the present invention.
Figure 1:
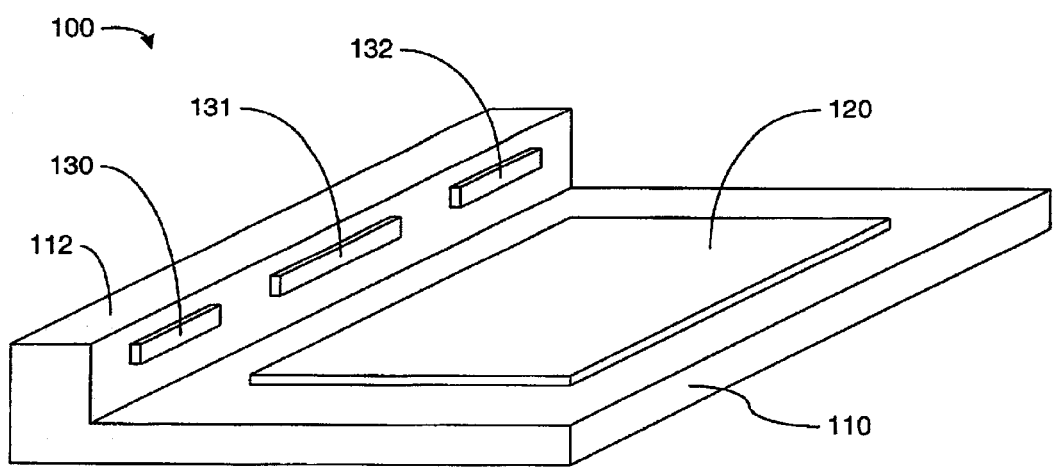

FIG. 1 is a perspective view of one embodiment. Computer cooler 100, comprised of base portion 110 attached to back portion 112, is shown in perspective with the top and front faces visible. Covering much of the top face of base portion 110 is cold plate 120. On the front face of rear portion 112 are connectors 130–132. Portable computer 150, comprised of base portion 160 and flat panel display portion 162, is shown with the bottom and rear faces visible. Covering much of the bottom face of base portion 160 is heat spreader 170. On the rear face of base portion 160 are connectors 180–182.

Computer cooler 100 is intended to mate with portable computer 150 such that connectors 130–132 of computer cooler 100 couple with connectors 180–182, respectively, of portable computer 150. One or more of connectors 180–182 may be intended to couple with various I/O devices such as a mouse, keyboard, removable media drive, etc. In turn, one or more of connectors 130–132 may provide ways by which electrical signals of connectors 180–182, respectively, are carried to replica connectors (not shown) on some other face or faces of computer cooler 100 to allow such I/O devices to be coupled to portable computer 150 through computer cooler 100 when portable computer 150 is mated to computer cooler 100. Either alternatively or additionally, one or more of connectors 130–132 may provide ways by which electrical signals of connectors 180–182, respectively, are carried to one or more devices within computer cooler 100, such as internally such as a disk drive, modem, network interface, etc.

Computer cooler 100 is also intended to mate with portable computer 150 such that the top surface of cold plate 120 makes contact with the bottom surface of heat spreader 170. Portable computer 150 is designed such that at least one of the components within portable computer 150 dissipates heat generated during operation of portable computer 150 via heat spreader 170. Heat spreader 170 may dissipate such heat by being in direct contact with such components, or such heat may be transferred indirectly from such components to heat spreader 170 by way of a heat pipe or other technology. When portable computer 150 is not mated with computer cooler 100, heat spreader 170 may be intended to dissipate heat to the environment surrounding portable computer 150, including the ambient air. However, when heat spreader 170 makes contact with cold plate 120, heat is conducted from heat spreader 170 to cold plate 120, allowing heat spreader 170 to dissipate heat to a greater degree than when heat spreader 170 is not in contact with cold plate 120. This greater degree of dissipating heat allows the one or more components of portable computer 150 that dissipate heat through heat spreader 170 to dissipate a greater amount of heat, thereby possibly enabling such components to either be operated faster (as by using a clock signal of an increased speed) or with more features of such components enabled. This, in turn, could increase the performance and/or capabilities of portable computer 150 when portable computer 150 is mated with compute cooler 100.

As depicted, computer cooler 100 is of a shape and configuration that would likely be referred to as a 'docking station' and portable computer 150 is of a shape and configuration that would likely be referred to as a 'notebook' computer. In such a shape and configuration, computer cooler 100 may contain peripherals or devices for use with portable computer 150, including disk drives, open locations for so-called 'add-in' circuit boards, etc. Although not depicted in FIG. 1, base portion 110 of computer cooler 100 could be made wedge-shaped so as to provide a slanted base on which portable computer 150 would sit when mated to computer cooler 100 to provide a more optimal position in which a keyboard carried by portable computer 150 (but not shown) could be used by an end user. However, it will be understood by those skilled in the art that the present invention could be practiced with computer cooler 100 being of any of a variety of shapes or configurations without departing from the spirit and scope of the invention as hereinafter claimed. It will also be understood by those skilled in the art that the present invention could be practiced (even with computer cooler 100 being of the shape depicted) with portable computers of any of a variety of shapes or configurations.

Also, although the discussion of the embodiment of FIG. 1 has been centered on the dissipation of heat from components within a portable computer with the aid of heat spreader 170, those skilled in the art will recognize that portable computer 150 may also be designed to make use of alternative ways to dissipate heat when not mated to computer cooler 100. Specifically, where a heat pipe or other technology is used to indirectly transfer such heat from such components to heat spreader 170, such a technology may also be used to transfer such heat to a heat exchanger or alternate apparatus to dissipate heat to the environment external to portable computer 150.

Furthermore, although computer cooler 100 and portable computer 150 are depicted as being meant to be coupled with a triplet of pairs of connectors, namely connectors 130–132 and 180–182, those skilled in the art will appreciate that the present invention may be practice with any number of connectors, whether paired or not, or with no connectors, at all.

Figure 2:
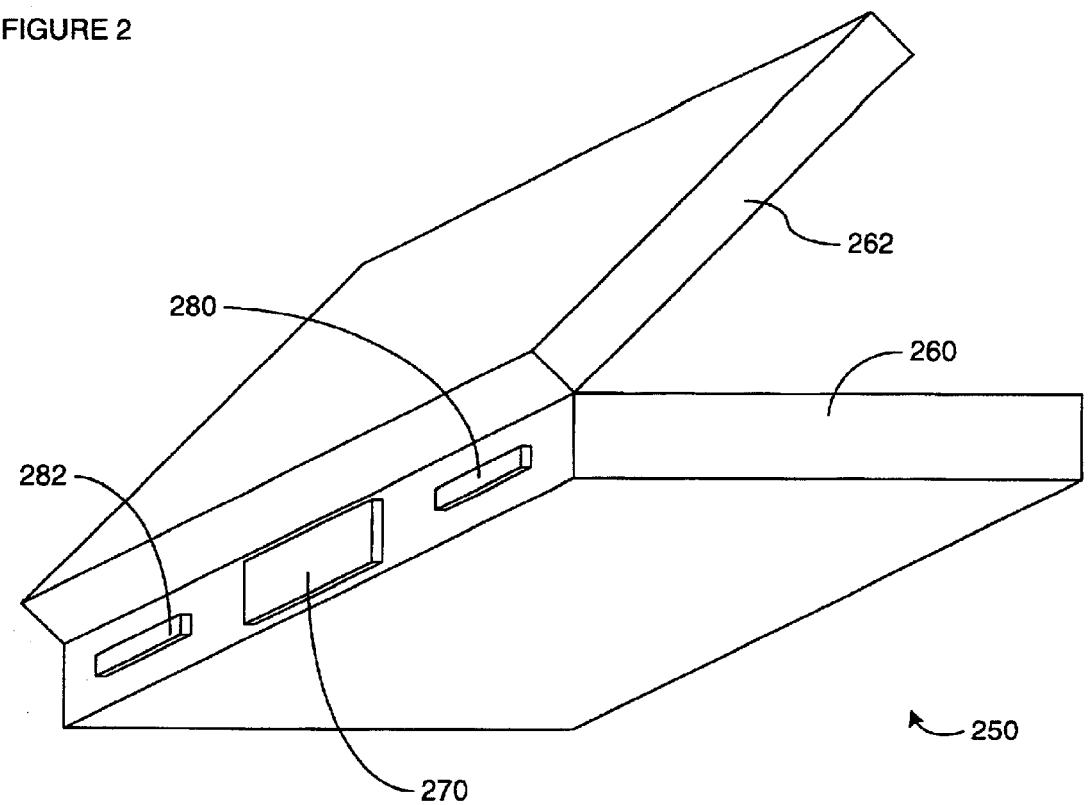
FIG. 2 is a perspective view of another embodiment of the present invention.
Figure 2:
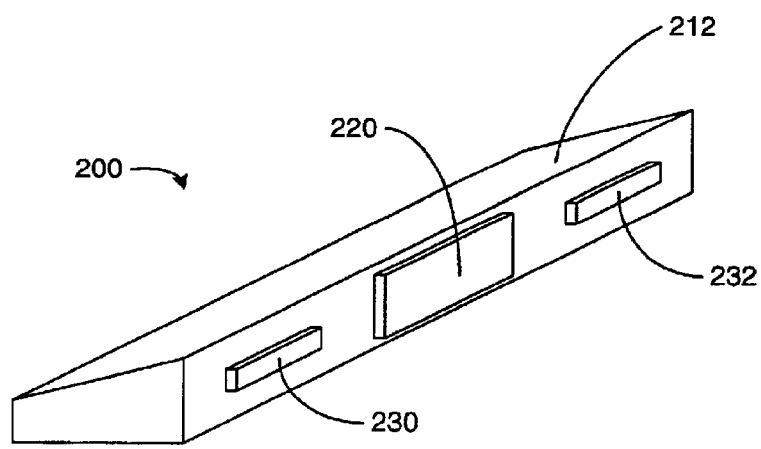

FIG. 2 is a perspective view of another embodiment of the present invention. Computer cooler 200 is shown in perspective with the top and front faces visible. Covering a portion of the front face is cold plate 220. Also on the front face are connectors 230 and 232. Portable computer 250, comprised of base portion 260 and flat panel display portion 262, is shown with the bottom and rear faces visible. Covering a portion of the rear face of base portion 160 is heat spreader 270. Also on the rear face of base portion 260 are connectors 280–282.

In a manner similar to the embodiment of FIG. 1, computer cooler 200 is intended to mate with portable computer 250 such that connectors 230 and 232 of computer cooler 200 couple with connectors 280 and 282, respectively, of portable computer 250. One or more of connectors 280 and 282 may be intended to couple with various I/O devices such as a mouse, keyboard, removable media drive, etc. In turn, one or more of connectors 230 and 232 may provide ways by which electrical signals of connectors 280 and 282, respectively, are carried to replica connectors (not shown) on some other face or faces of computer cooler 200 to allow such I/O devices to be coupled to portable computer 250 through computer cooler 200 when portable computer 150 is mated to computer cooler 200. Either alternatively or additionally, one or more of connectors 230 and 232 may provide ways by which electrical signals of connectors 280 and 282, respectively, are carried to one or more devices within computer cooler 200, such as internally such as a disk drive, modem, network interface, etc.

Also in a manner similar to the embodiment of FIG. 1, computer cooler 200 is also intended to mate with portable computer 250 such that the front-facing surface of cold plate 220 makes contact with the rear-facing surface of heat spreader 270. Portable computer 250 is designed such that at least one of the components within portable computer 250 (such as a CPU) dissipates heat generated during operation of portable computer 250 via heat spreader 270. Heat spreader 270 may dissipate such heat by being in direct contact with such components, or such heat may be transferred indirectly from such components to heat spreader 270 by way of a heat pipe or other technology. When portable computer 250 is not mated with computer cooler 200, heat spreader 270 may be intended to dissipate heat to the environment surrounding portable computer 250, including the ambient air. However, when heat spreader 270 makes contact with cold plate 220, heat is conducted from heat spreader 270 to cold plate 220, allowing heat spreader 270 to dissipate heat to a greater degree than when heat spreader 270 is not in contact with cold plate 220. This greater degree of dissipating heat allows the one or more components of portable computer 250 that dissipate heat through heat spreader 270 to dissipate a greater amount of heat, thereby possibly enabling such components to either be operated faster or with more features of such components enabled. This, in turn, could increase the performance and/or capabilities of portable computer 250 when portable computer 250 is mated with compute cooler 200.

As depicted, computer cooler 200 is of a shape and configuration that would likely be referred to as a 'port replicator' and portable computer 250 is of a shape and configuration that would likely be referred to as a 'notebook' computer. Although not depicted in FIG. 2, computer cooler 200 could be made to mate with portable computer 250 such that with both computer cooler 200 and portable computer 250 set on a flat surface, such as a desk or table, computer cooler 200 would tend to raise the rearmost end of base portion 260 of portable computer 250 to provide a more optimal position in which a keyboard carried by portable computer 250 (but not shown) could be used by an end user. However, it will be understood by those skilled in the art that the present invention could be practiced with computer cooler 200 being of any of a variety of shapes or configurations without departing from the spirit and scope of the invention as hereinafter claimed. It will also be understood by those skilled in the art that the present invention could be practiced (even with computer cooler 200 being of the shape depicted) with portable computers of any of a variety of shapes or configurations.

Also, although the discussion of the embodiment of FIG. 2 has been centered on the dissipation of heat from components within a portable computer with the aid of heat spreader 270, those skilled in the art will recognize that portable computer 250 may also be designed to make use of alternative ways to dissipate heat when not mated to computer cooler 200. Specifically, where a heat pipe or other technology is used to indirectly transfer such heat from such components to heat spreader 270, such a technology may also be used to transfer such heat to a heat exchanger or alternate apparatus to dissipate heat to the environment external to portable computer 250.

Figure 3:
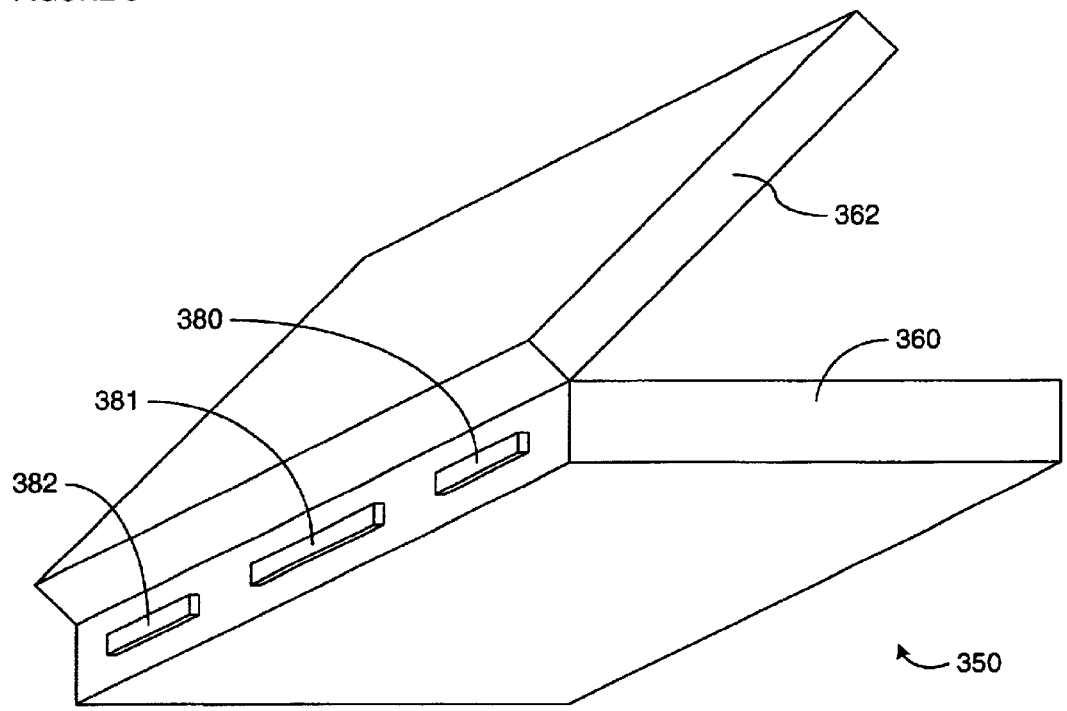
FIG. 3 is a perspective view of still another embodiment of the present invention.
Figure 3:
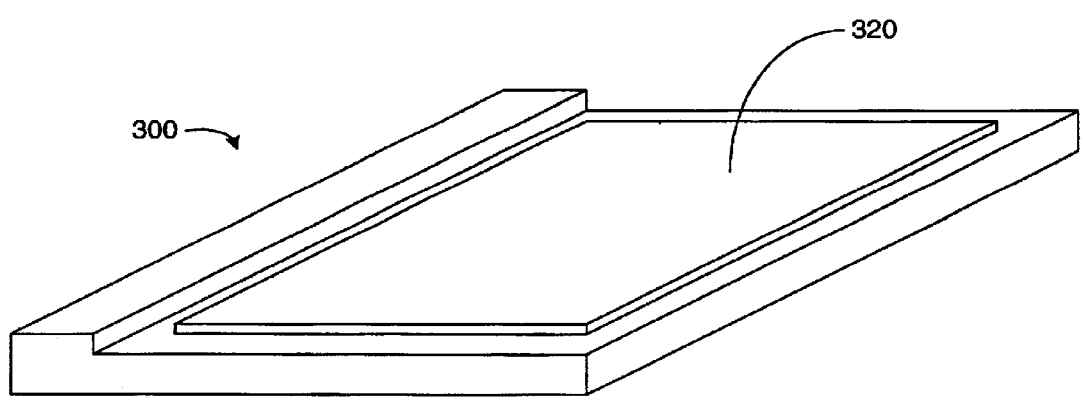

FIG. 3 is a perspective view of one embodiment of the present invention. Computer cooler 300 is shown in perspective with the top and front faces visible. Covering much of the top face is cold plate 320. Portable computer 350, comprised of base portion 360 and flat panel display portion 362, is shown with the bottom and rear faces visible. On the rear face of base portion 360 are connectors 380–382.

Unlike the embodiments depicted in FIGS. 1 and 2, computer cooler 300 does not have connectors that mate with connectors 380–382 of portable computer 350. This is due to computer cooler 300 being configured to be more generic than in the embodiments depicted in FIGS. 1 and 2. Computer cooler 300 is configured to provide cooling to any of a number of differing portable computers that are not necessarily designed to mate with computer cooler 300.

Also unlike the embodiments depicted in FIGS. 1 and 2, cold plate 320 of computer cooler 300 is configured for use with portable computers, that like portable computer 350, do not have a heat spreader configured specifically to mate with cold plate 320 of computer cooler 300. Again, this is due to computer cooler 300 being configured to be more generic than in the embodiments depicted in FIGS. 1 and 2. Cold plate 320 is configured to provide a surface that comes into contact with bottom face of a variety of different portable computers, like portable computer 350, to provide cooling for components within such portable computers by conducting heat away from the bottom face of such portable computers. When the bottom face of base portion 360 of portable computer 350 makes contact with cold plate 320, heat is conducted from the bottom face of base portion 360 to cold plate 320, allowing portable computer 350 to dissipate heat to a greater degree than when not in contact with cold plate 320. This greater degree of dissipating heat allows the one or more components of portable computer 350 to dissipate a greater amount of heat, thereby possibly enabling those components to either be operated faster (as by using a clock signal of an increased speed) or with more features enabled. This, in turn, could increase the performance and/or capabilities of portable computer 350 when portable computer 350 is mated with computer cooler 300.

As depicted, computer cooler 300 is of a shape and configuration that would likely be referred to as a 'docking station' and portable computer 350 is of a shape and configuration that would likely be referred to as a 'notebook' computer. In such a shape and configuration, computer cooler 300 may contain peripherals or devices for use with portable computer 350, including disk drives, open locations for so-called 'add-in' circuit boards, etc. In support of such peripherals or devices within computer cooler 300, or in support of passing through signals of connectors 380, 381 and/or 382 of portable computer 350, computer cooler 300 may additionally be comprised of connectors (not shown) that mate with one or more of connectors 380, 381 and/or 382.

Although computer cooler 300 has been discussed as being more generic than the embodiments depicted in FIGS. 1 and 2, it may be that a variation of computer cooler 300 may be designed specifically for use with one or more models or types portable computer, or may be designed specifically for use with portable computers of a specific manufacturer. It may be the case that although such a variation of computer cooler 300 may be designed to work more optimally with one or more of such specific portable computers, those specific portable computers may not actually be designed to work with a computer cooler such as computer cooler 300, at all. Specifically, it may be the case that a variation of computer cooler 300 is designed specifically for use with one or more specific models of portable computer 350 that do not provide such facilities as heat spreader 170 or 270 of portable computers 150 and 250 of FIGS. 1 and 2, i.e., models of portable computer 350 that provide no facilities for cooling that were ever specifically intended to mate with computer cooler 300.

Furthermore, although not depicted in FIG. 3, computer cooler 300 could be made wedge-shaped so as to provide a slanted base on which portable computer 350 would sit and provide a more optimal position in which a keyboard carried by portable computer 350 (but not shown) could be used by an end user. However, it will be understood by those skilled in the art that the present invention could be practiced with computer cooler 300 being of any of a variety of shapes or configurations without departing from the spirit and scope of the invention as hereinafter claimed.

Figure 4:
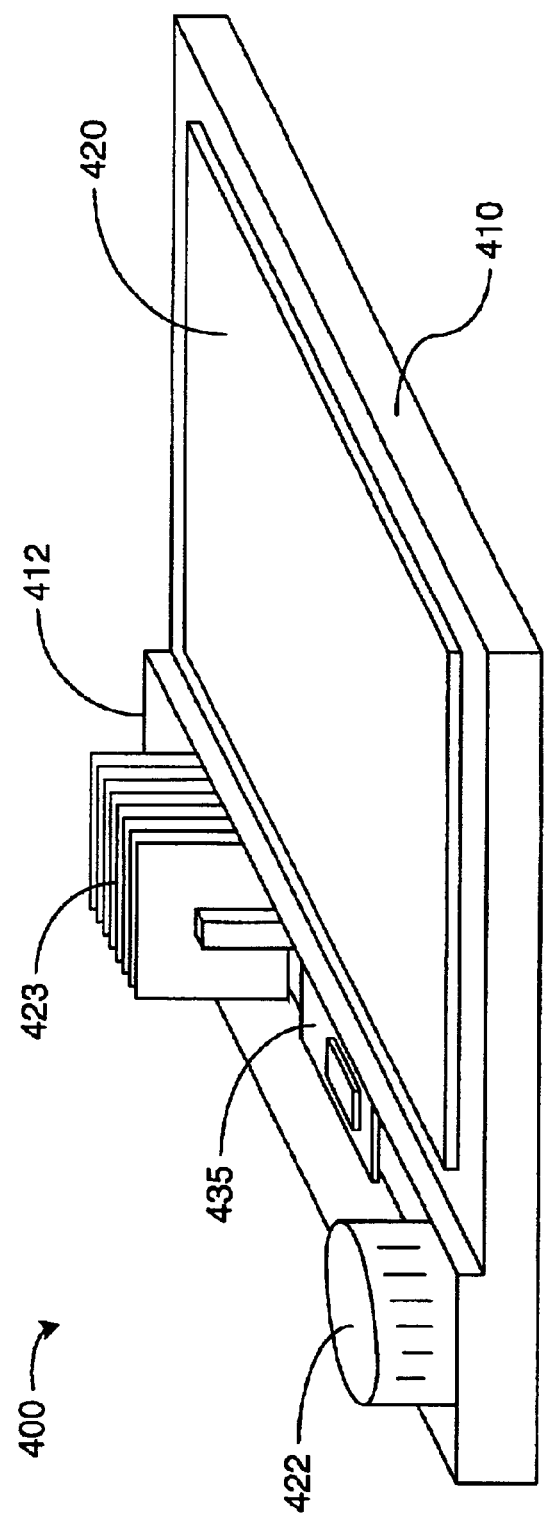
FIG. 4 is a perspective view of yet another embodiment of the present invention revealing internal components.

FIG. 4 is a perspective view of an embodiment with a portion of an outer casing removed to reveal components of an internal cooling apparatus. Computer cooler 400 is comprised of base portion 410 and rear portion 412. Within base portion 410 is an evaporator (not shown) that is either integrated with or situated underneath and in direct contact with cold plate 420 to cool a portable computer (not shown) when a portable computer is set on top of base portion 410. Within rear portion 412 is compressor 422, condenser 423 and controller 435.

In one variation of the embodiment depicted in FIG. 4, compressor 422, condenser 423 and the evaporator either integrated into or in contact with cold plate 420 cooperate to use a refrigerant to transfer heat away from cold plate 420 and release that heat into the air surrounding condenser 423. Compressor 422 draws refrigerant away from the evaporator, and sends it under pressure to condenser 423. An expansion valve (not shown) interposed between condenser 423 and the evaporator restricts the flow of refrigerant returning from condenser 423 to the evaporator, thereby assisting in maintaining the refrigerant at a higher pressure within condenser 423 than within the evaporator. At a lower pressure and temperature within the evaporator, the refrigerant absorbs heat present at the evaporator, and more specifically, heat present at cold plate 420. At a higher pressure and temperature within condenser 423, the refrigerant releases the absorbed heat.

In another variation, within rear portion 412 of computer cooler 400 may also be a fan (not shown), positioned to provide a steady flow of air across surfaces of condenser 423 to aid in the transfer of heat from the refrigerant to the air surrounding computer cooler 400. However, as those skilled in the art will recognize, the presence of such a fan is not necessary to the practice of the present invention. Specifically, condenser 423 could be positioned or otherwise configured to allow heat to be effectively transferred from the refrigerant to the air surrounding computer cooler 400 by way of convection, alone.

In still another variation, controller 435, shown in FIG. 4 as being comprised of a circuit board and an integrated circuit, controls the process of transferring heat from cold plate 420 to condenser 423. In one variation of this embodiment, controller 435 monitors the temperature of either the evaporator or cold plate 420 to ensure that a predetermined degree of cooling of cold plate 420 is being achieved. In this variation, computer cooler 400 might not actually coordinate the cooling function performed by computer cooler 400 with the operation of components within the portable computer. Specifically, computer cooler 400 may independently provide cooling to a portable computer to a predetermined degree, while the portable computer set atop the cold plate may independently increase or decrease the level of performance (as by using a clock signal with a faster or slower speed) or the number or type of features enabled within one or more of its components in response to the degree to which the portable computer is being cooled by computer cooler 400. In another variation of this embodiment, a portable computer set atop the cold plate may communicate with controller 435 to relay the degree of cooling required or desired for the operation of the portable computer while set atop the cold plate. The portable computer may convey to controller 435 data reflecting the temperature within the portable computer or of one or more of the components within the portable computer. Alternatively, the portable computer may convey commands to controller 435 to signal controller 435 to start or stop the cooling process performed within computer cooler 400, or to increase or decrease the degree to which cooling is being carried out.

Although computer cooler 400 is shown to be making use of a refrigerant-based cooling system, those skilled in the art will recognize that a variety of other forms of cooling system making use of any of a number of cooling technologies may be used without departing from the spirit or scope of the present invention as hereinafter claimed. Such technologies may include, but are not limited to, thermoelectric technology, a vapor compression system (similar to what is often found in common household appliances), or a gas compression system (e.g., Stirling or Brayton type cooling systems) where changes in the phase of a gas are used to effect cooling.

The invention has been described in conjunction with the preferred embodiment. It is evident that numerous alternatives, modifications, variations and uses will be apparent to those skilled in the art in light of the foregoing description. Although the invention has been discussed repeatedly as being used in conjunction with portable computers systems in the form of "notebook" computers systems, it will be understood by those skilled in the art that the present invention may be practiced in conjunction with a variety of computer systems of varying shapes, sizes and configurations. Furthermore, although the example embodiments of the present invention are described in the context of cooling down a portable computer system to allow increases in the performance of its components, it will be understood by those skilled in the art that such cooling of a portable computer system may be performed for other reasons, including counteracting the effects of operating a portable computer system in an environment with temperatures high enough to have an undesirable impact on the normal function of the components within such a portable computer system.

What is claimed is:

1. A computer cooler comprising:
   a cold plate to come into contact with a portable computer system to transfer heat away from the portable computer system;
   a cooling system to transfer heat from the cold plate to the environment surrounding the computer cooler when the portable computer system is in contact with the cold plate.
   a first connector to make to an external connector of the portable computer system when the portable computer system is in contact with the cold plate; and
   a controller to receive a command from the portable computer indicating the desired degree of cooling, and to control the cooling system to ensure that the desired degree of cooling indicated by the portable computer is achieved while the portable computer is in contact with the cold plate, wherein the controller monitors the temperature of the cold plate to aid in controlling the degree of cooling achieved by the cooling system.

2. The computer cooler of claim 1, wherein the cooling system is comprised of a compressor, an evaporator, a condenser and a refrigerant that cooperate to transfer heat from the cold plate to the environment surrounding the computer cooler.

3. The computer cooler of claim 1, further comprising a second connector that replicates the external connector of the portable computer system, allowing an external device to be attached to the computer cooler through the second connector and thereby receive signals from the external connector of the portable computer system through the first and second connectors.

4. An apparatus, comprising:
   a portable computer system with a heat spreader to transfer heat away from at least one component within the portable computer system;
   a cold plate provided by a computer cooler to come into contact with the heat spreader to transfer heat from the heat spreader of the portable computer;
   a cooling system within the computer cooler to transfer heat away from the cold plate to the environment surrounding the computer cooler when the heat spreader of the portable computer system is in contact with the cold plate;
   a first connector provided by the computer cooler to mate to an external connector of the portable computer system when the portable computer system is in contact with the cold plate; and
   a controller within the computer cooler to receive a command from the portable computer indicating the desired degree of cooling, and to control the cooling system to ensure that the desired degree of cooling indicated by the portable computer is achieved while the heat spreader of the portable computer is in contact with the cold plate, wherein the controller monitors the temperature of the cold plate to aid in controlling the degree of cooling achieved by the cooling system.

5. The apparatus of claim 4, wherein the cooling system is comprised of a compressor, an evaporator, a condenser and a refrigerant that cooperate to transfer heat from the cold plate to the environment surrounding the computer cooler.

6. The apparatus of claim 4, further comprising a second connector provided by the computer cooler that replicates the external connector of the portable computer system, allowing an external device to be attached to the computer cooler through the second connector and thereby receive signals from the external connector of the portable computer system through the first and second connectors.

7. The apparatus of claim 4, further comprising a component within the portable computer system having a feature that is disabled at a time when the heat spreader of the portable computer system is not in contact with the cold plate, and that is enabled at a time when the heat spreader of the portable computer is in contact with the cold plate.

8. A method, comprising:
   placing a portable computer system into contact with a cold plate of computer cooler;
   mating a first connector of the computer cooler to an external connector of the portable computer system;
   receiving a command by a controller within the computer cooler from the portable computer system indicating the degree of cooling desired;
   transferring heat from the cold plate of the computer to the environment surrounding the computer cooler;
   controlling the transferring of heat from the cold plate to ensure that the desired degree of cooling indicated by the portable computer system is achieved while the portable computer system is in contact with the cold plate; and
   basing the controlling of the transferring of heat from the cold plate on input received from monitoring the temperature of the cold plate.

9. The method of claim 8, further comprising providing a second connector carried by the computer cooler that replicates the external connector of the portable computer system, allowing an external device to be attached to the computer cooler through the second connector and thereby receive signals from the external connector of the portable computer system through the first and second connectors.

10. The method of claim 8, wherein placing a portable computer system in contact with the cold plate of a computer cooler comprises placing a heat spreader of the portable computer system in contact with the cold plate of the computer cooler.

11. The method of claim 8, further comprising enabling a feature of a component of the portable computer system at a time when the portable computer system is in contact with the cold plate that is disabled at a time when the portable computer is not in contact with the cold plate.

* * * * *